(12) United States Patent
Fujito et al.

(10) Patent No.: US 12,354,860 B2
(45) Date of Patent: Jul. 8, 2025

(54) ANALYSIS METHOD, ADSORPTION PREVENTION AGENT, AND ANALYSIS KIT

(71) Applicants: NATIONAL UNIVERSITY CORPORATION KOBE UNIVERSITY, Hyogo (JP); SHIMADZU CORPORATION, Kyoto (JP)

(72) Inventors: Yuka Fujito, Kyoto (JP); Takanari Hattori, Kyoto (JP); Tomohisa Hasunuma, Hyogo (JP)

(73) Assignees: NATIONAL UNIVERSITY CORPORATION KOBE UNIVERSITY, Hyogo (JP); SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 18/143,628

(22) Filed: May 5, 2023

(65) Prior Publication Data

US 2023/0274925 A1 Aug. 31, 2023

Related U.S. Application Data

(63) Continuation of application No. 17/289,074, filed as application No. PCT/JP2019/042574 on Oct. 30, 2019, now Pat. No. 11,694,886.

(30) Foreign Application Priority Data

Nov. 2, 2018 (JP) .................................. 2018-207620

(51) Int. Cl.
*H01J 49/00* (2006.01)
*G01N 30/72* (2006.01)
(Continued)

(52) U.S. Cl.
CPC ...... *H01J 49/0445* (2013.01); *G01N 30/7266* (2013.01); *H01J 49/0031* (2013.01);
(Continued)

(58) Field of Classification Search
CPC ............... H01J 49/0445; H01J 49/0031; H01J 49/0036; H01J 49/165; G01N 30/7266; G01N 2030/027
(Continued)

(56) References Cited

U.S. PATENT DOCUMENTS 7,125,492 B2 * 10/2006 Bidlingmeyer ...... B01D 15/325
210/656
2005/0011836 A1 * 1/2005 Bidlingmeyer ...... B01D 15/426
210/639
(Continued)

FOREIGN PATENT DOCUMENTS

| CN | 103819513 A | 5/2014 |
|---|---|---|
| JP | S61-047560 A | 3/1986 |
| JP | 2009-528544 A | 8/2009 |

OTHER PUBLICATIONS

International Search Report for corresponding Application No. PCT/JP2019/042574, mailed Jan. 28, 2020.
(Continued)

*Primary Examiner* — Michael Maskell
(74) *Attorney, Agent, or Firm* — Renner, Otto, Boisselle & Sklar, LLP

(57) ABSTRACT

An analysis method includes: performing liquid chromatography using a mobile phase including an adsorption prevention agent for preventing adsorption of a sample including a compound having a phosphate group to metal; and performing mass spectrometry on an eluate of the liquid chromatography. The adsorption prevention agent includes an oxalic acid or a salt of the oxalic acid.

4 Claims, 5 Drawing Sheets

(51) Int. Cl.
*H01J 49/04* (2006.01)
*H01J 49/16* (2006.01)
*G01N 30/02* (2006.01)

(52) U.S. Cl.
CPC ........ *H01J 49/0036* (2013.01); *H01J 49/165* (2013.01); *G01N 2030/027* (2013.01)

(58) Field of Classification Search
USPC ........................................ 250/281, 282, 288
See application file for complete search history.

(56) References Cited

U.S. PATENT DOCUMENTS

| | | | |
|---|---|---|---|
| 2008/0073500 A1 | 3/2008 | Cerda | |
| 2014/0245818 A1* | 9/2014 | Nakayama | H10K 85/344 73/61.55 |

OTHER PUBLICATIONS

Written Opinion for corresponding Application No. PCT/JP2019/042574, mailed Jan. 28, 2020.
Oka, et al., "Food analysis by LC / MS" HPC News, Hayashi Junyaku Kogyo Co., Ltd., Jan. 13, 2004, vol. 28, p. 1-11 and its Machine English translation.
Office Action for corresponding JP Application No. 2020-553977 dated Nov. 1, 2021, with English language machine translation.
Allowed claims from Parent U.S. Appl. No. 17/289,074, filed Apr. 27, 2021.
Notification of Reasons for Refusal for corresponding Chinese Patent Application No. 201980072065.8 dated Sep. 27, 2023, with English machine translation.
Notification of Reasons for Refusal for corresponding Chinese Patent Application No. 201980072065.8 dated Jul. 11, 2024, with English machine translation.

* cited by examiner (A)

| Sample | Detection intensity of sample in comparative example 2 (Formic Acid-based mobile phase) (A.U.) | Detection intensity of sample in example 2 (Oxalic Acid-based mobile phase) (A.U.) |
|---|---|---|
| 0.1 $\mu$M CDP | 53,108 | 128,524 |
| 0.1 $\mu$M GDP | 53,108 | 187,367 |

ANALYSIS METHOD, ADSORPTION PREVENTION AGENT, AND ANALYSIS KIT

This is a continuation under 35 USC § 120 of U.S. application Ser. No. 17/289,074, filed Apr. 27, 2021, which is a § 371 of International Application No. PCT/JP2019/042574, filed Oct. 30, 2019, the entire disclosures of which are incorporated herein by reference.

TECHNICAL FIELD

The present invention relates to an analysis method, an adsorption prevention agent, and an analysis kit.

BACKGROUND ART

Compounds having a phosphate group play an important role within a cell and the like. For example, a nucleic acid in which nucleic acid bases are linked by a phosphodiester bond via a phosphate group codes genetic information. Nucleotide adenosine triphosphate (ATP) is involved in various reactions by using energy stored in the bond between phosphate groups.

Analysis of the compound having a phosphate group is important for analysis of functions of a living body and the like, abnormalities that cause diseases, and the like. For example, by quantitatively determining cell metabolites, information on generation and decomposition of substances in the cell can be obtained.

In analysis of a sample containing a plurality of compounds, such as analysis of cell metabolites, a plurality of compounds is separated and analyzed by liquid chromatography/mass spectrometry (hereinafter, appropriately referred to as LC/MS). However, there is a problem that some compounds contained in the sample cause metal adsorption on a pipe of a liquid chromatograph and the like, thereby lowering detection sensitivity. For example, Non Patent Literature 1 describes addition of an oxalic acid to a mobile phase for preventing tetracycline antibiotics from causing tailing in liquid chromatography due to metal adsorption. The method of Non Patent Literature 1 decomposes an oxalic acid by atmospheric pressure chemical ionization to prevent contamination and clogging of a mass spectrometer.

CITATION LIST

Non Patent Literature

Non Patent Literature 1: Oka and two others, "Food Analysis by LC/MS", HPC News, Hayashi Pure Chemical Ind., Ltd., Jan. 13, 2004, Vol. 28, pp. 1-11

SUMMARY OF INVENTION

Technical Problem

In a liquid chromatograph, in a conventional mobile phase containing a formic acid, a compound having a phosphate group such as nucleotide causes metal adsorption in piping or the like in some cases. Therefore, there is a problem that these compounds do not reach an analysis column and sensitivity is lowered, or a signal-to-noise ratio (S/N ratio) is deteriorated and accuracy is lowered.

Solution to Problem

According to a first aspect of the present invention, an analysis method includes: performing liquid chromatography using a mobile phase including an adsorption prevention agent for preventing adsorption of a sample including a compound having a phosphate group to metal in a stationary phase; and performing mass spectrometry on an eluate of the liquid chromatography.

According to a second aspect of the present invention, in the analysis method of the first aspect, the compound having a phosphate group is preferably at least one of a nucleic acid, a nucleotide, and a derivative of the nucleic acid or the nucleotide.

According to a third aspect of the present invention, in the analysis method of the first or second aspect, the sample preferably includes an extract from a cell.

According to a fourth aspect of the present invention, in the analysis method of any one of the first to fourth aspects, in the mass spectrometry, the sample is preferably ionized by an electrospray method.

According to a fifth aspect of the present invention, an adsorption prevention agent for preventing adsorption of a sample including a compound having a phosphate group to metal in a stationary phase, and the adsorption prevention agent is added to a mobile phase of liquid chromatography/mass spectrometry.

According to a sixth aspect of the present invention, an analysis kit includes the adsorption prevention agent of the sixth aspect.

Advantageous Effects of Invention

The present invention makes it possible to detect a compound having a phosphate group such as a nucleotide separated by liquid chromatography with high sensitivity or high accuracy in mass spectrometry.

BRIEF DESCRIPTION OF DRAWINGS

FIG. 5 is a table showing detection intensity of samples when performing LC/MS/MS using a mobile phase containing a formic acid and a mobile phase containing an oxalic acid on a sample containing cytidine diphosphate (CDP) and a sample containing guanosine diphosphate (GDP).

DESCRIPTION OF EMBODIMENT

Figure 1:
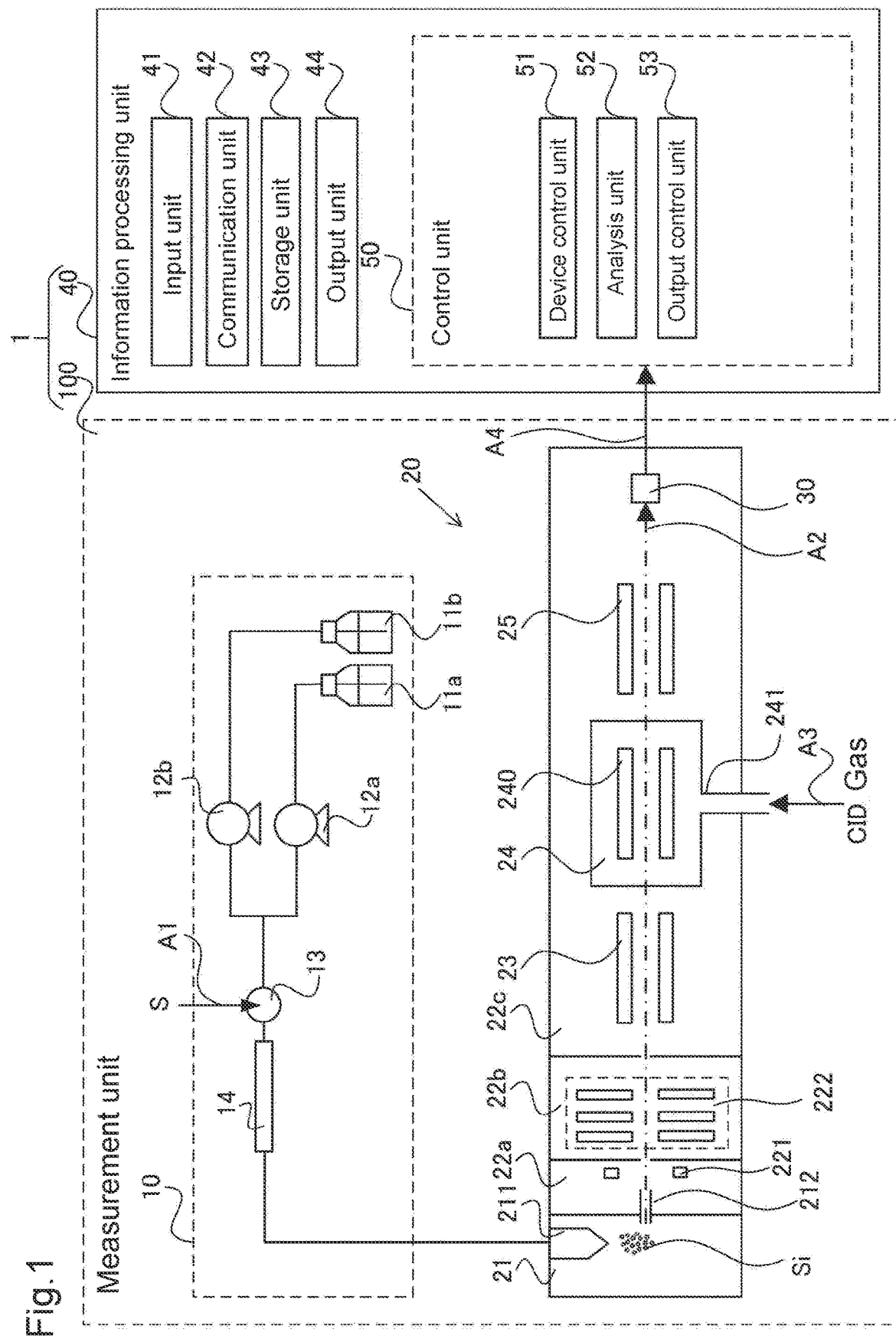
FIG. 1 is a conceptual diagram for describing an analysis device according to one embodiment.

An embodiment for executing the present invention will be described below with reference to the drawings.

First Embodiment

Conventionally, when a sample containing a plurality of compounds is subjected to LC/MS (hereinafter, "LC/MS" includes the case of performing two or more stages of mass spectrometry), such as analysis of metabolites in a cell, a mobile phase containing a formic acid has been used for the purpose of assisting ionization. However, in the conventional method using a formic acid in the mobile phase, there is a problem that a compound having a phosphate group such as nucleotide causes metal adsorption in piping or the like as described above. In an analysis method of the present embodiment, LC/MS is performed using a mobile phase containing an oxalic acid to sensitively analyze a compound having a phosphate group.

(About Sample)

A sample is not particularly limited as long as the sample contains the compound having a phosphate group. As the amount of phosphate group contained in the compound increases, adsorptivity to metal increases, and thus the analysis method of the present embodiment can be suitably applied. Due to its importance as an analysis target, at least one of a nucleic acid, a nucleotide, and a derivative thereof is preferable as the compound having a phosphate group contained in the sample. A method for derivatizing the derivative is not particularly limited as long as the phosphate group is present.

The sample is preferably collected from an organism because the sample contains various substances and separation analysis by LC/MS is effectively applied. However, the sample may not originate in an organism, such as an artificially synthesized nucleic acid, nucleotide, or derivative thereof. The sample is more preferably an extract from a cell because a component contained in the cell can be effectively separated and analyzed by LC/MS. The sample further preferably contains a cell metabolite because a compound having a phosphate group involved in metabolic reaction can be suitably analyzed.

(About Pretreatment)

A method of sample pretreatment is not particularly limited as long as the sample for analysis is prepared so as to contain components to be analyzed and LC/MS is performed with desired accuracy. In the pretreatment, extraction, concentration, or other purification is performed as appropriate from the collected sample to include the component to be analyzed. When the sample is a cell or tissue originating in an organism and the metabolite is analyzed, for example, after separating a cytoplasmic component by crushing or the like, a hydrophilic metabolite is extracted by a methanol/chloroform extraction method or the like, and the extracted hydrophilic metabolite is concentrated. The resulting solution is appropriately diluted and introduced into a liquid chromatograph.

(About Analysis Device)

Liquid chromatography and mass spectrometry in the analysis method of the present embodiment are preferably performed using a liquid chromatograph/mass spectrometer as an analysis device. However, analysis can also be performed using a separately controlled liquid chromatograph and a mass spectrometer.

FIG. 1 is a conceptual diagram showing a configuration of the analysis device according to the analysis method of the present embodiment. The analysis device 1 includes a measurement unit 100 and an information processing unit 40. The measurement unit 100 includes a liquid chromatograph 10 and a mass spectrometer 20.

The liquid chromatograph 10 includes mobile phase containers 11a and 11b, liquid feed pumps 12a and 12b, a sample introduction unit 13, and an analysis column 14. The mass spectrometer 20 includes an ionization chamber 21 including an ionization unit 211, a first vacuum chamber 22a including an ion lens 221, a tube 212 that introduces ions from the ionization chamber 21 to the first vacuum chamber 22a, a second vacuum chamber 22b including an ion guide 222, and a third vacuum chamber 22c. The third vacuum chamber 22c includes a first mass separation unit 23, a collision cell 24, a second mass separation unit 25, and a detection unit 30. The collision cell 24 includes an ion guide 240 and a CID gas inlet 241.

The information processing unit 40 includes an input unit 41, a communication unit 42, a storage unit 43, an output unit 44, and a control unit 50. The control unit 50 includes a device control unit 51, an analysis unit 52, and an output control unit 53.

The liquid chromatograph 10 separates an introduced sample S by liquid chromatography. The type of liquid chromatograph 10 is not particularly limited as long as the sample can be separated with desired accuracy. As the liquid chromatograph 10, nano LC, micro LC, high-performance liquid chromatograph (HPLC), ultra high-performance liquid chromatograph (UHPLC), and the like can be used.

The mobile phase containers 11a and 11b include containers capable of storing liquid such as vials and bottles, and each store mobile phases having different compositions. The mobile phases stored in the mobile phase containers 11a and 11b are referred to as mobile phase A and mobile phase B, respectively.

At least one of the mobile phase A and the mobile phase B contains an oxalic acid. The concentration of the oxalic acid contained in the mobile phase A or the mobile phase B is preferably 0.1 mM or more, more preferably 0.5 mM or more. As the concentration of the oxalic acid increases, metal adsorption of the compound having a phosphate group can be greatly inhibited. In other words, the oxalic acid functions as an adsorption prevention agent for preventing adsorption of the sample containing the compound having a phosphate group to metal. If the concentration of the oxalic acid is too high, sensitivity in mass spectrometry will decrease, and thus the concentration of the oxalic acid contained in the mobile phase A or mobile phase B is preferably 50 mM or less, more preferably 10 mM or less. The concentration of the oxalic acid in the mobile phase A and the mobile phase B is preferably the same substantially.

Note that the mobile phase may contain a salt of oxalic acid.

The type of solvent of the mobile phase A and the mobile phase B is not particularly limited, and composition of the mobile phase is determined such that the ratio of an aqueous solvent to an organic solvent differs between the mobile phase A and the mobile phase B. For example, it is possible to use water as the solvent of the mobile phase A and acetonitrile as the solvent of the mobile phase B.

The liquid feed pumps 12a and 12b feed the mobile phase A and the mobile phase B at a predetermined flow rate, respectively. The mobile phase A and the mobile phase B respectively output from the liquid feed pumps 12a and 12b are mixed in the middle of a flow path and introduced into the sample introduction unit 13. The liquid feed pumps 12a and 12b change the composition of the mobile phase introduced into the analysis column 14 over time by changing the flow rates of the mobile phase A and the mobile phase B, respectively.

Information indicating the composition of the mobile phase at each time from time corresponding to a start of analysis such as introduction of the sample S is referred to as a gradient program. The liquid feed pumps 12a and 12b are controlled based on the gradient program, and the mobile phases having the set composition are introduced into the analysis column 14. Data corresponding to the gradient program is stored in the storage unit 43, and the device control unit 51 controls the liquid feed pumps 12a and 12b with reference to the data.

The sample introduction unit 13 includes a sample introduction device such as an autosampler, and introduces the sample S for analysis prepared by pretreatment into the mobile phases (arrow A1). The sample S introduced by the sample introduction unit 13 passes through a guard column (not shown) as appropriate and is introduced into the analysis column 14.

The analysis column 14 includes a stationary phase, and elutes each component contained in the introduced sample S at different retention times by using the difference in affinity of the component for the mobile phases and the stationary phase. The type of analysis column 14 is not particularly limited as long as each component of the sample S can be separated with desired accuracy, but a pentafluorophenylpopyl (PFPP) column is preferable from the viewpoint of suitably separating base, nitrogen, amine, or the like. The PFPP column is a column containing a pentafluorophenyl-propyl group in the stationary phase. As the analysis column 14, a filler containing metal is preferable because the filler is likely to cause metal adsorption of the sample and the analysis method of the present embodiment is suitably applied to the filler.

An eluate eluted from the analysis column 14 is introduced into the ionization unit 211 of the mass spectrometer 20. It is preferable that the eluate from the analysis column 14 does not need an operation such as dispensing by a user of the analysis device 1 (hereinafter, simply referred to as "user"), and that the eluate is input into the mass spectrometer 20 by online control.

The mass spectrometer 20 performs tandem mass spectrometry on an eluted sample introduced from the analysis column 14, and detects each component of the sample, particularly an ion corresponding to the compound having a phosphate group, as an analysis target. A path of a sample ion Si obtained by ionizing the eluted sample is schematically shown with an arrow A2 of alternate long and short dash lines. Here, the sample ion Si also includes an ion generated by dissociation of the sample ion Si.

Note that the configuration of each unit of the mass spectrometer 20 is not particularly limited as long as the sample ion Si can be detected with desired accuracy.

The ionization unit 211 of the mass spectrometer 20 ionizes the introduced eluted sample. The ionization method is not particularly limited as long as the eluted sample is ionized to the extent that the component to be analyzed is detected with desired accuracy, but when performing LC/MS/MS as in the present embodiment, the electrospray method (ESI) is preferable, and the following embodiment will also be described assuming that ESI is performed. The sample ion Si emitted from the ionization unit 211 and generated moves due to a pressure difference between the ionization chamber 21 and the first vacuum chamber 22a, and the like, passes through the tube 212, and enters the first vacuum chamber 22a.

Air is exhausted from the first vacuum chamber 22a, the second vacuum chamber 22b, and the third vacuum chamber 22c by a vacuum pump (not shown), the degree of vacuum increases in this order, and air is exhausted to high vacuum such as, for example, $10^{-2}$ Pa or less from the third vacuum chamber 22c. The ion entering the first vacuum chamber 22a passes through the ion lens 221 and is introduced into the second vacuum chamber 22b. The ion entering the second vacuum chamber 22b passes through the ion guide 222 and is introduced into the third vacuum chamber 22c. The ion introduced into the third vacuum chamber 22c is emitted to the first mass separation unit 23. By the time the ion enters the first mass separation unit 23, the ion lens 221, the ion guide 222, and the like converge the passing ion by an electromagnetic action.

The first mass separation unit 23 includes a quadrupole mass filter, and selectively passes an ion having set m/z (corresponding to a mass-to-charge ratio except for certain coefficient difference) as a precursor ion and emits the ion toward the collision cell 24 by the electromagnetic action based on a voltage applied to the quadrupole mass filter. The first mass separation unit 23 selectively passes the sample ion Si to be analyzed as a precursor ion.

The collision cell 24 dissociates the sample ion Si to be analyzed by collision induced dissociation (CID) while controlling movement of the ion by the ion guide 240 to generate a fragment ion. Gas containing argon, nitrogen, and the like that collides with the ion during CID (hereinafter referred to as CID gas) is introduced from the CID gas inlet 241 to predetermined pressure in the collision cell (arrow A3). The sample ion Si containing the generated fragment ion is emitted toward the second mass separation unit 25.

The second mass separation unit 25 includes a quadrupole mass filter, and selectively passes the fragment ion having set m/z and emits the ion toward the detection unit 30 by the electromagnetic action based on the voltage applied to the quadrupole mass filter.

The detection unit 30 includes an ion detector such as a secondary electron multiplier tube or a photomultiplier tube, and detects the emitted fragment ion. The detection mode may be either a positive ion mode for detecting a positive ion or a negative ion mode for detecting a negative ion. A detection signal obtained by detecting the fragment ion undergoes A/D conversion by an A/D converter (not shown), becomes a digital signal, and is input as measurement data to the control unit 50 of the information processing unit 40 (arrow A4).

The information processing unit 40 includes an information processing device such as a computer, and performs processing such as communication, storage, and calculation regarding various data, in addition to serving as an interface with a user as appropriate. The information processing unit 40 is an information processing device that performs processing of control, analysis, and display of the measurement unit 100.

Note that the information processing unit 40 may be configured as one device integrated with the liquid chromatograph 10 and the mass spectrometer 20. Some of the data to be used for the analysis method of the present embodiment may be saved in a remote server or the like, and some of the calculation processing to be performed by the analysis method may be performed by a remote server or the like. Operations of each unit of the measurement unit 100 may be controlled by the information processing unit 40 or by a device constituting each unit.

The input unit 41 of the information processing unit 40 includes an input device such as a mouse, a keyboard, various buttons, and/or a touch panel. The input unit 41 receives from the user information necessary for processing to be performed by the control unit 50, such as an m/z value of ion to be detected.

The communication unit 42 of the information processing unit 40 includes a communication device capable of communication by wireless or wired connection via a network such as the Internet. The communication unit 42 receives data necessary for the measurement of the measurement unit 100, transmits data processed by the control unit 50 such as an analysis result of the analysis unit 52, and transmits and receives necessary data as appropriate.

The storage unit 43 of the information processing unit 40 includes a non-volatile storage medium. The storage unit 43 stores the measurement data output from the measurement unit 100, a program for the control unit 50 to perform processing, and the like.

The output unit 44 of the information processing unit 40 is controlled by the output control unit 53, and includes at least one of a display device such as a liquid crystal monitor and a printer. The output unit 44 outputs information regarding the measurement of the measurement unit 100, information corresponding to the analysis result of the analysis unit 52, and the like by displaying the information on a display device or printing the information on printed media.

The control unit 50 of the information processing unit 40 includes a processor such as a CPU. The control unit 50 performs various processes by executing the program stored in the storage unit 43 or the like, such as control of the measurement unit 100 and analysis of the measurement data output from the measurement unit 100.

The device control unit 51 of the control unit 50 controls the measurement operation of the measurement unit 100 based on analysis conditions and the like set according to input and the like via the input unit 41. The device control unit 51 controls the flow rates of the liquid feed pumps 12a and 12b, controls the dissociation in the collision cell 24, controls the m/z value of ion selectively passed through the first mass separation unit 23 and the second mass separation unit 25, and the like.

The analysis unit 52 performs analysis such as quantitative determination of the component to be analyzed in the sample based on the measurement data output from the measurement unit 100. The analysis unit 52 acquires detection intensity corresponding to the component to be analyzed from the measurement data output from the detection unit 30, and stores the detection intensity in the storage unit 43 or the like.

When an internal standard is measured, the analysis unit 52 calculates the value obtained by multiplying the ratio of the detection intensity corresponding to the component to be analyzed divided by the detection intensity corresponding to the internal standard by the concentration of the introduced internal standard as an amount of each component. When the internal standard is not used, standardized intensity such as intensity standardized with the detection intensity of a reference substance or substance group may be calculated. The analysis unit 52 creates data corresponding to a chromatogram in which the retention time and the detection intensity are associated with each other.

Note that the method of analysis by the analysis unit 52 is not particularly limited.

The output control unit 53 creates an output image including information about analysis conditions, information obtained by analysis of the analysis unit 52, and the like, and outputs the output image to the output unit 44.

(Analysis Kit)

Figure 2:
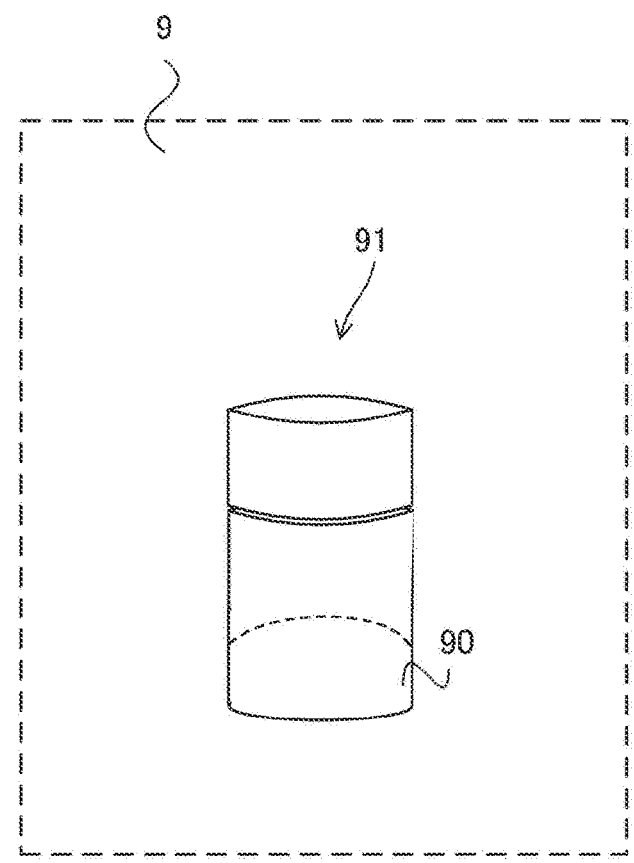
FIG. 2 is a conceptual diagram schematically showing an analysis kit according to one embodiment.

FIG. 2 is a diagram schematically showing an analysis kit to be used for the analysis method according to the present embodiment. The analysis kit 9 includes an adsorption prevention agent 90 for preventing adsorption of the sample S containing the compound having a phosphate group to metal, and the adsorption prevention agent 90 contains an oxalic acid or a salt thereof. The adsorption prevention agent 90 is stored in a vial 91, and the type, size, and shape of the container to store the adsorption prevention agent 90 are not particularly limited.

Note that the analysis kit 9 can include arbitrary consumables and the like to be used for liquid chromatography and mass spectrometry in addition to the adsorption prevention agent 90.

Figure 3:
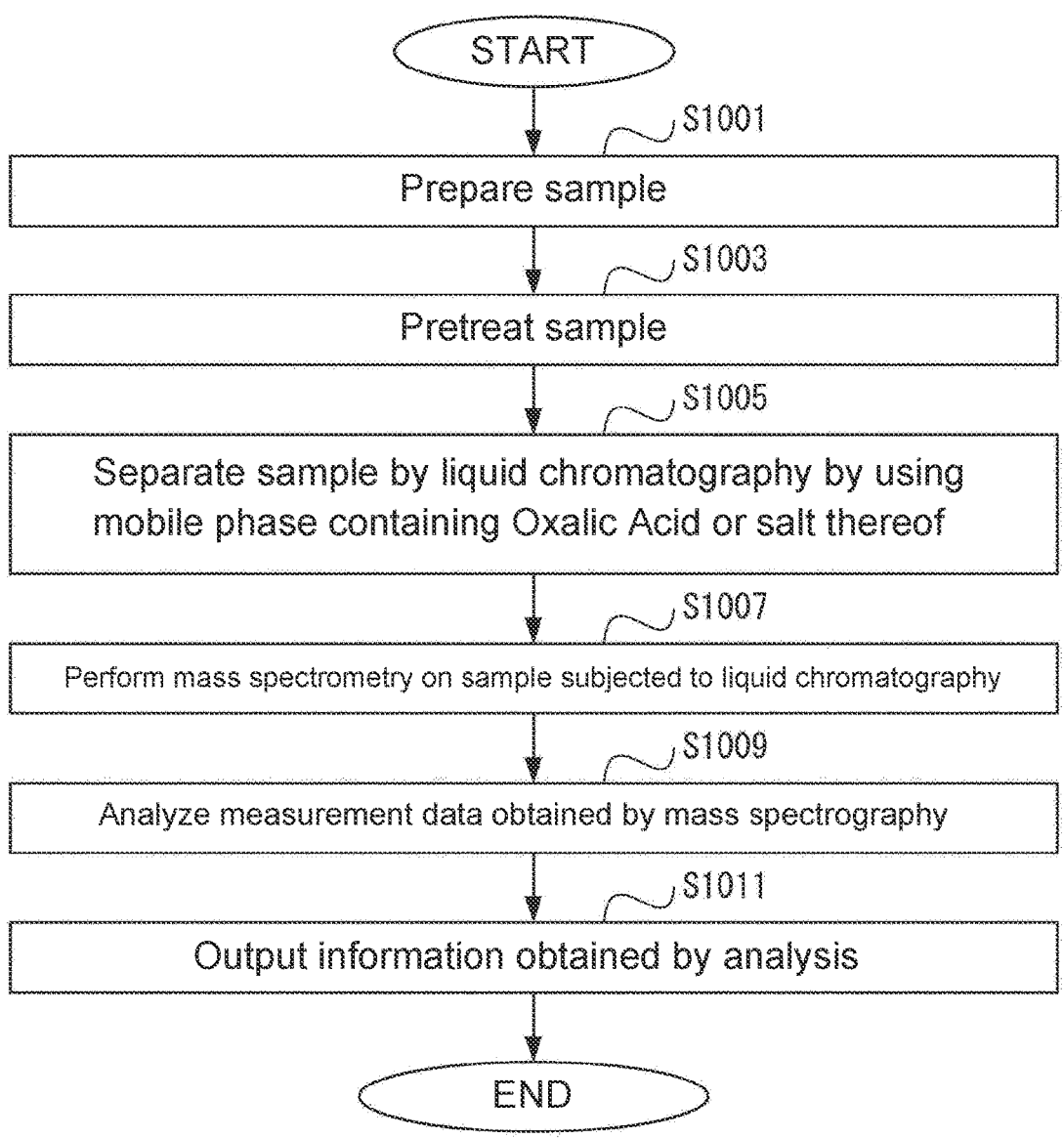
FIG. 3 is a flowchart showing a flow of an analysis method of one embodiment.

FIG. 3 is a flowchart showing a flow of the analysis method according to the present embodiment. In step S1001, the sample S is prepared by an analyst, a user, or the like. When step S1001 is completed, step S1003 is started. In step S1003, the sample is pretreated by the analyst, the user, or the like. When step S1003 is completed, step S1005 is started.

In step S1005, the liquid chromatograph 10 separates the sample S by liquid chromatography by using a mobile phase containing an oxalic acid or a salt thereof. When step S1005 is completed, step S1007 is started. In step S1007, the mass spectrometer 20 performs mass spectrometry on the sample S subjected to liquid chromatography. When step S1007 is completed, step S1009 is started.

In step S1009, the analysis unit 52 analyzes the measurement data obtained by mass spectrometry. When step S1009 is completed, step S1011 is started. In step S1011, the output unit 44 outputs information obtained by the analysis. When step S1011 is completed, the process is completed.

According to the above-described embodiment, the following effects can be obtained.

(1) An analysis method according to the present embodiment includes: performing liquid chromatography using a mobile phase including an adsorption prevention agent for preventing adsorption of a sample S including a compound having a phosphate group to metal; and performing mass spectrometry on an eluate of the liquid chromatography. The adsorption prevention agent includes an oxalic acid or a salt of the oxalic acid. By this method, metal adsorption of compounds having a phosphate group such as nucleotide can be inhibited in the liquid chromatography, and these compounds can be detected with high sensitivity or high accuracy in the mass spectrometry.

(2) In the analysis method according to the present embodiment, in the mass spectrometry, the sample S is ionized by an electrospray method. By this method, molecules of various molecular weights contained in a living body or the like can be suitably ionized without being destroyed.

(3) An adsorption prevention agent according to the present embodiment for preventing adsorption of a sample including a compound having a phosphate group to metal includes an oxalic acid or a salt of the oxalic acid, and the adsorption prevention agent is added to a mobile phase of liquid chromatography/mass spectrometry. With this adsorption prevention agent, the adsorption of compounds having a phosphate group such as nucleotide to metal can be inhibited in the liquid chromatography, and these compounds can be detected with high sensitivity or high accuracy in the mass spectrometry.

(4) An analysis kit according to the present embodiment includes the adsorption prevention agent 90. With this analysis kit, the above-described analysis can be performed quickly.

The following modifications are also within the scope of the present invention and can be combined with the above-described embodiment. In the following modifications, parts showing the structure and function as in the above-described embodiment are referred to with the same reference symbol, and descriptions will be omitted as appropriate.

(First Modification)

The analysis device 1 of the above-described embodiment is a triple quadrupole mass spectrometer, but the configuration of the mass spectrometer 20 is not particularly limited. The mass spectrometer 20 may include a mass separation unit including one mass spectrograph, or may include a mass separation unit including two or more mass spectrographs having a combination different from the above-described embodiment. For example, the analysis device 1 can include an ion trap or a time-of-flight mass separation unit.

The method of dissociation is not limited to the above-described CID, and can be appropriately selected according to the type of analysis device 1 and characteristics of the molecule to be analyzed, such as photoinduced dissociation, electron capture dissociation, or electron transfer dissociation.

The present invention is not limited to details of the above-described embodiment. Other aspects that can be considered within the scope of the technical idea of the present invention are also included within the scope of the present invention.

EXAMPLES

The following examples describe results of performing LC/MS/MS on a sample containing a nucleotide having a known concentration by using a mobile phase containing a formic acid and a mobile phase containing an oxalic acid.

Note that the present invention is not limited to numerical values and conditions shown in the following examples.

Comparative Example 1

In Comparative Example 1, a 0.1 μM CTP solution was analyzed using a mobile phase to which 0.1% by volume of formic acid was added.
Condition for Liquid Chromatography
The sample for analysis was separated by liquid chromatography under the following condition.
 System: Nexera X2 (Shimadzu)
 Analysis column: Discovery HS F5-3 (Sigma-Aldrich) (inner diameter 2.1 mm, length 150 mm, particle size 3 μm)
 Injection volume: 3 μL
 Column temperature: 40° C.
Mobile Phase:
 (A) 0.1% formic acid (dissolved in water)
 (B) 0.1% formic acid (dissolved in acetonitrile)
 Flow speed: 0.25 mL/min
Gradient Program:

| Time (minutes) | Concentration of mobile phase B (%) |
|---|---|
| 0 | 0 |
| 2 | 0 |
| 5 | 25 |
| 11 | 35 |
| 15 | 95 |
| 20 | 95 |
| 20.1 | 0 |
| 35 | 0 |

Condition for Mass Spectrometry
The eluted sample eluted by the above-described liquid chromatography was detected by tandem mass spectrometry directly connected to an elution port.
 System: LCMS-8050 (Shimadzu)
 Ionization method: Electrospray method, positive ion mode
 Measurement mode: Multiple reaction monitoring (MRM)
Temperature:
 Desolvation line (DL) temperature: 250° C.
 Heat block temperature: 400° C.
 Interface temperature: 300° C.
Gas Flow Rate:
 Nebulizer gas flow rate: 3.0 L/min
 Drying gas flow rate: 10.0 L/min
 Heating gas flow rate: 10.0 L/min As the ion corresponding to CTP, the precursor ion of m/z 483.90 was separated and subjected to CID, and then a product ion of m/z 112.20 was separated and detected.

Figure 4:
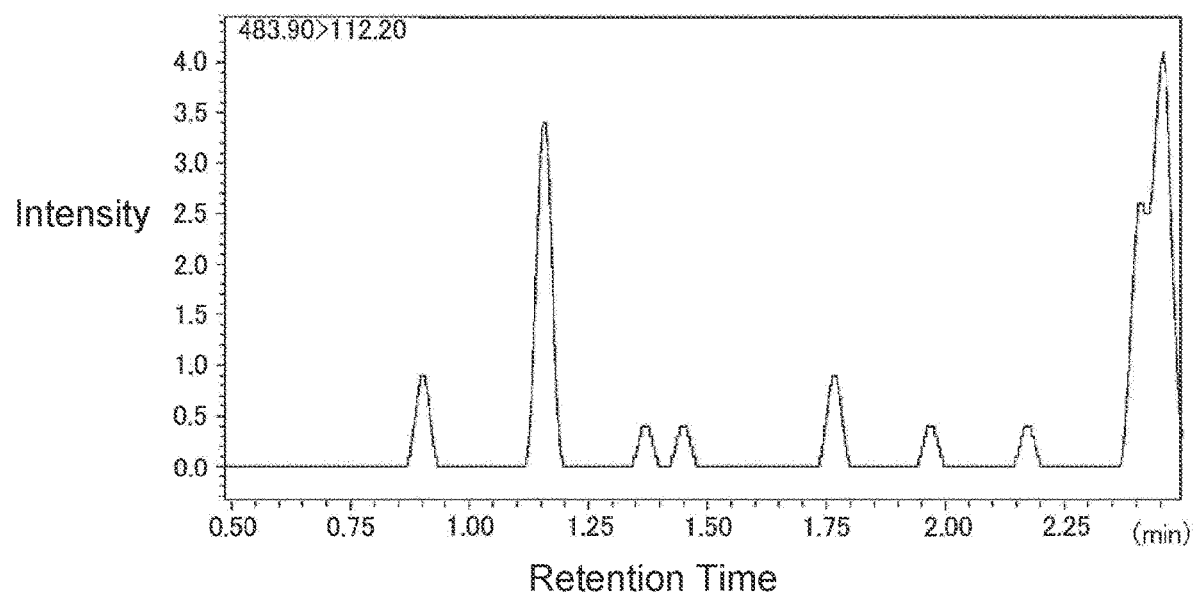
FIG. 4(A) is a mass spectrum obtained when performing liquid chromatography/tandem mass spectrometry (LC/MS/MS) using a mobile phase containing a formic acid on a sample containing cytidine triphosphate (CTP).
FIG. 4(B) is a mass spectrum obtained when performing LC/MS/MS using a mobile phase containing an oxalic acid on a sample containing CTP.
Figure 4:
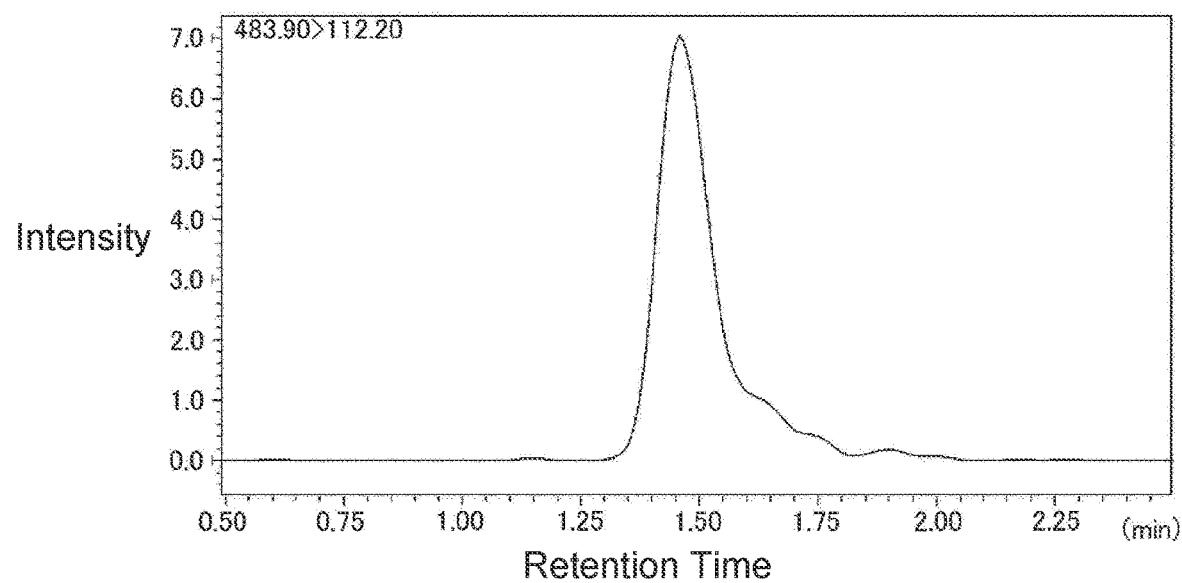

FIG. 4(A) is a mass chromatogram obtained by mass spectrometry of Comparative Example 1. Intensity of each peak was so small that substantially no CTP was unable to be detected.

Example 1

In Example 1, a 0.1 μM CTP solution was analyzed using a mobile phase to which 10 mM oxalic acid was added.
Condition for Liquid Chromatography
The sample for analysis was separated by liquid chromatography under the following condition.
 System: NexeraX2 (Shimadzu)
 Analysis column: Discovery HS F5-3 (Sigma-Aldrich) (inner diameter 2.1 mm, length 150 mm, particle size 3 μm)
 Injection volume: 3 μL
 Column temperature: 40° C.
Mobile Phase:
 (A) 10 mM oxalic acid (dissolved in water)
 (B) 10 mM oxalic acid (dissolved in acetonitrile)
 Flow speed: 0.3 mL/min
Gradient Program:

| Time (minutes) | Concentration of mobile phase B (%) |
|---|---|
| 0 | 0 |
| 3 | 0 |
| 9 | 100 |
| 13 | 100 |
| 13.01 | 0 |
| 17 | 0 |

Condition for Mass Spectrometry
The eluted sample eluted by the above-described liquid chromatography was detected by tandem mass spectrometry directly connected to the elution port.
 System: LCMS-8050 (Shimadzu)
 Ionization method: Electrospray method, positive ion mode
 Measurement mode: MRM
Temperature:
 Desolvation line (DL) temperature: 250° C.
 Heat block temperature: 400° C.
 Interface temperature: 300° C.
Gas Flow Rate:
 Nebulizer gas flow rate: 3.0 L/min
 Drying gas flow rate: 10.0 L/min
 Heating gas flow rate: 10.0 L/min As the ion corresponding to CTP, the precursor ion of m/z 483.90 was separated and subjected to CID, and then a product ion of m/z 112.20 was separated and detected.

FIG. 4(B) is a mass chromatogram obtained by mass spectrometry of Example 1. In Example 1, a peak corresponding to CTP, which is much larger than each peak in Comparative Example 1, was detected. In Example 1, no significant increase in noise was observed, and the S/N ratio also increased.

Comparative Example 2

In Comparative Example 2, a mobile phase to which 0.1% by volume of formic acid was added was used, and under substantially the same conditions as in Comparative Example 1, a 0.1 µM cytidine diphosphate (CDP) solution and a 0.1 µM guanosine diphosphate (GDP) solution were analyzed. In mass spectrometry, transitions were set to detect each of CDP and GDP.

Example 2

In Example 2, a mobile phase to which 10 mM oxalic acid was added was used, and under substantially the same conditions as in Example 1, a 0.1 µM CDP solution and a 0.1 µM GDP solution were analyzed. In mass spectrometry, transitions were set to detect each of CDP and GDP.

FIG. 5 is a table showing results of Comparative Example 2 and Example 2. As the detection intensity of the sample, the area of a peak corresponding to the sample after removing the background is shown. CDP and GDP have fewer phosphate groups than ATP and are thought to be less adversely affected by metal adsorption, but even when these molecules were used as the sample, sensitivity was increased more than in the case of using the formic acid-based mobile phase by using the oxalic acid-based mobile phase.

The disclosure of the priority basic application below is incorporated herein by reference.

Japanese Patent Application No. 2018-207620 (filed on Nov. 2, 2018)

REFERENCE SIGNS LIST 1 analysis device
9 analysis kit
10 liquid chromatograph
11a, 11b mobile phase container
14 analysis column
20 mass spectrometer
21 ionization chamber
23 first mass separation unit
24 collision cell
25 second mass separation unit
30 detection unit
40 information processing unit
50 control unit
51 device control unit
52 analysis unit
53 output control unit
90 adsorption prevention agent
100 measurement unit
211 ionization unit
S sample
Si sample ion

The invention claimed is:

1. An analysis method comprising:
performing liquid chromatography using a stationary phase containing a metal and a mobile phase including an adsorption prevention agent for preventing adsorption of a sample including a compound having a phosphate group to the metal contained in the stationary phase; and
performing mass spectrometry on an eluate of the liquid chromatography.

2. The analysis method according to claim 1, wherein the compound having a phosphate group is at least one of a nucleic acid, a nucleotide, and a derivative of the nucleic acid or the nucleotide.

3. The analysis method according to claim 1, wherein the sample includes an extract from a cell.

4. The analysis method according to claim 1, wherein in the mass spectrometry, the sample is ionized by an electrospray method.

* * * * *